United States Patent
Ladouceur et al.

(10) Patent No.: US 8,564,937 B2
(45) Date of Patent: Oct. 22, 2013

(54) MULTI-PLANE ACTIVATION SIDE KEY FOR A MOBILE ELECTRONIC DEVICE

(75) Inventors: Norman Miner Ladouceur, Waterloo (CA); Jason Tyler Griffin, Waterloo (CA)

(73) Assignee: BlackBerry Limited, Waterloo (CA)

( * ) Notice: Subject to any disclaimer, the term of this patent is extended or adjusted under 35 U.S.C. 154(b) by 485 days.

(21) Appl. No.: 12/955,004

(22) Filed: Nov. 29, 2010

(65) Prior Publication Data

US 2012/0134077 A1    May 31, 2012

(51) Int. Cl.
*H05K 5/00* (2006.01)
*H05K 7/00* (2006.01)
*G06F 1/16* (2006.01)
*H04M 1/00* (2006.01)

(52) U.S. Cl.
USPC .............. 361/679.01; 361/679.3; 361/679.56; 455/575.1

(58) Field of Classification Search
USPC ........... 455/575.1; 361/679.01, 679.3, 679.56
See application file for complete search history.

(56) References Cited

U.S. PATENT DOCUMENTS

| 5,523,531 A | 6/1996 | Ozaki |
| 6,011,543 A | 1/2000 | Tian |
| 6,148,183 A | 11/2000 | Higdon |
| 6,275,215 B1 | 8/2001 | Kim |
| 2003/0036362 A1* | 2/2003 | Buesseler et al. ............... 455/90 |
| 2009/0009945 A1* | 1/2009 | Johnson et al. ............... 361/681 |
| 2009/0134003 A1 | 5/2009 | Okidate |
| 2009/0315828 A1 | 12/2009 | Tan |

FOREIGN PATENT DOCUMENTS

| DE | 19951258 C1 | 4/2001 |
| WO | 2010080906 A1 | 7/2010 |

OTHER PUBLICATIONS

Examination Report dated Aug. 2, 2012 for corresponding EP patent application No. 10193024.6; 5 pages.
Extended European Search Report on corresponding EP Patent Application No. 10193024.6, mailed Apr. 29, 2011; 5 pages.

* cited by examiner

*Primary Examiner* — Anthony Haughton
(74) *Attorney, Agent, or Firm* — Ridout & Maybee LLP

(57) ABSTRACT

An input mechanism for a mobile electronic device is disclosed. A cap shaped to wrap around an edge of the mobile electronic device is moveable in a first direction and a second direction. A first switch for activating a first function is covered by the cap and actuatable upon movement of the cap in the first direction toward the first switch. A second switch for activating a second function is covered by the cap and actuatable upon movement of the cap in the second direction toward the second switch.

20 Claims, 6 Drawing Sheets

MULTI-PLANE ACTIVATION SIDE KEY FOR A MOBILE ELECTRONIC DEVICE

TECHNICAL FIELD

The present disclosure relates generally to an input mechanism for a mobile electronic device.

BACKGROUND

Mobile electronic devices, such as mobile telephones, smartphones, MP3 music players, personal digital assistants (PDAs), compact gaming machines, and laptop computers are becoming increasingly more popular. There is pressure to make these devices more compact. As well, display screens often take up a large proportion of a top surface of the devices. As a result, there is less room for input mechanisms, such as function keys.

The small size of most mobile electronic devices also makes it difficult for some users with physical disabilities to operate function keys located on sides of the device, especially if the device lying flat on a surface.

BRIEF DESCRIPTION OF THE DRAWINGS

Like reference numerals are used in the drawings to denote like elements and features.

DETAILED DESCRIPTION OF EXAMPLE EMBODIMENTS

Aspects of the present disclosure provide an input mechanism, such as a function key, on an edge of a mobile electronic device that is actuatable from two or more directions. In some embodiments the function key is actuatable from two or more planar directions. In some embodiments, each direction of actuation is associated with a different function. By adding another planar directional force to a key, the limited space available on a mobile electronic device is efficiently used. In other embodiments, the same function can be activated by actuating the input mechanism in more than one direction. It is sometimes difficult to access a function key on the side of a mobile electronic device when the device is lying flat on a surface and therefore, it may be beneficial to be able to actuate the same key from the front of the device, for example.

In one aspect, there is provided an input mechanism for a mobile electronic device, the input mechanism comprising: a cap shaped to wrap around an edge of the mobile electronic device and moveable in a first direction and a second direction; and a first switch for activating a first function on the mobile electronic device, the first switch being covered by the cap and actuatable upon movement of the cap in the first direction toward the first switch; a second switch for activating a second function on the mobile electronic device, the second switch being covered by the cap and actuatable upon movement of the cap in the second direction toward the second switch.

In another aspect, there is provided a mobile electronic device comprising: an input mechanism including a cap shaped to wrap around an edge of the mobile electronic device and moveable in a first direction and a second direction and a first switch for activating a first function on the mobile electronic device, the first switch being covered by the cap and actuatable upon movement of the cap in the first direction toward the first switch and a second switch for activating a second function on the mobile electronic device, the second switch being covered by the cap and actuatable upon movement of the cap in the second direction toward the second switch; a processor for implementing the first function upon actuation of the first switch and the second function upon actuation of the second switch; and a circuit connecting the input mechanism to the processor.

Figure 1:
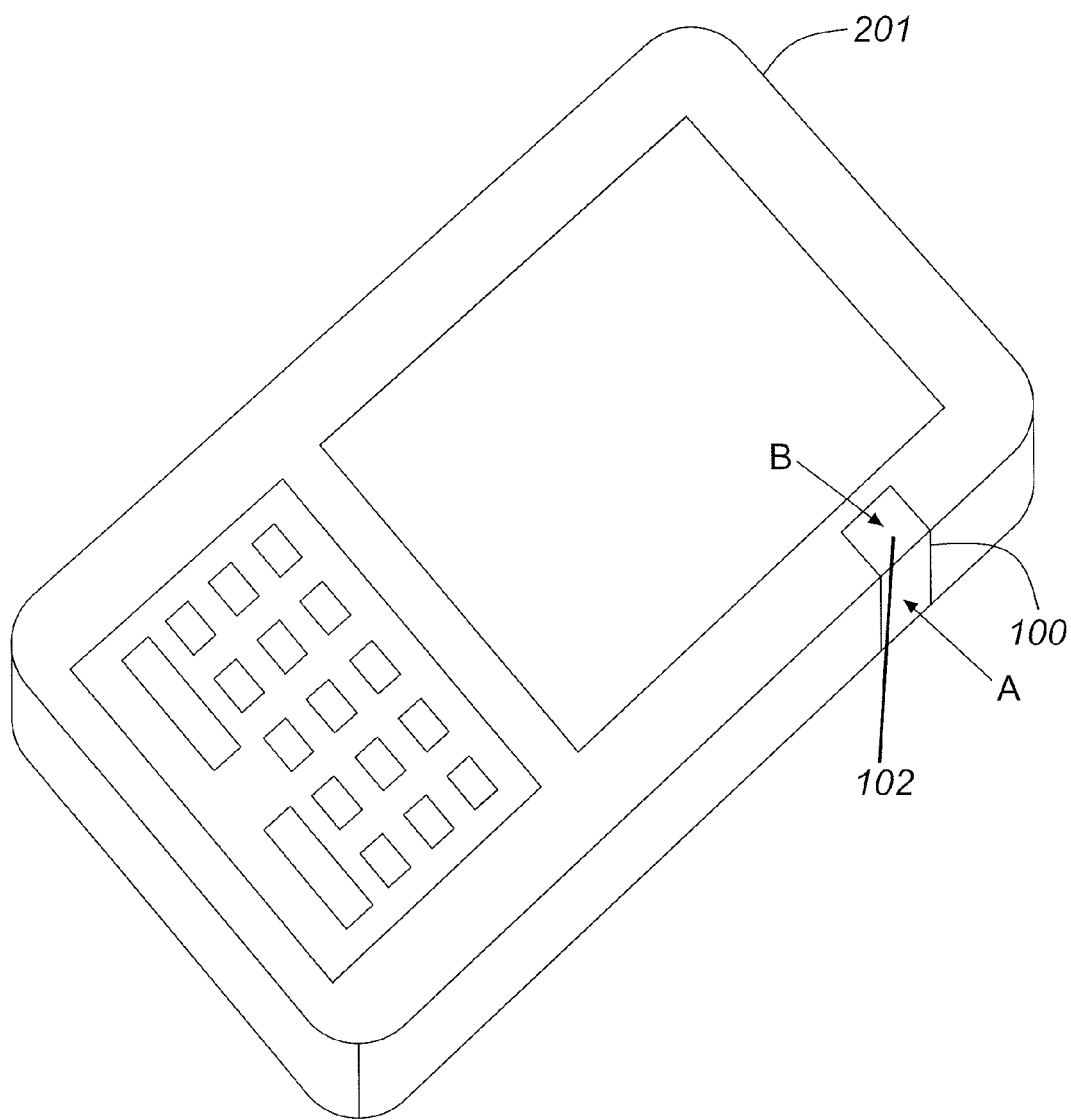
FIG. 1 is a perspective view of a mobile electronic device with an input mechanism in accordance with one example embodiment of the present disclosure.

Referring to FIG. 1, an exemplary mobile electronic device 201 according to one embodiment of the present disclosure has an input mechanism 100 with a cap 102 on an edge. The cap 102 is moveable in at least two directions A and B. Moving the cap in either direction actuates one of at least two switches, which in turn activates a function on the mobile electronic device 201.

Figure 2:
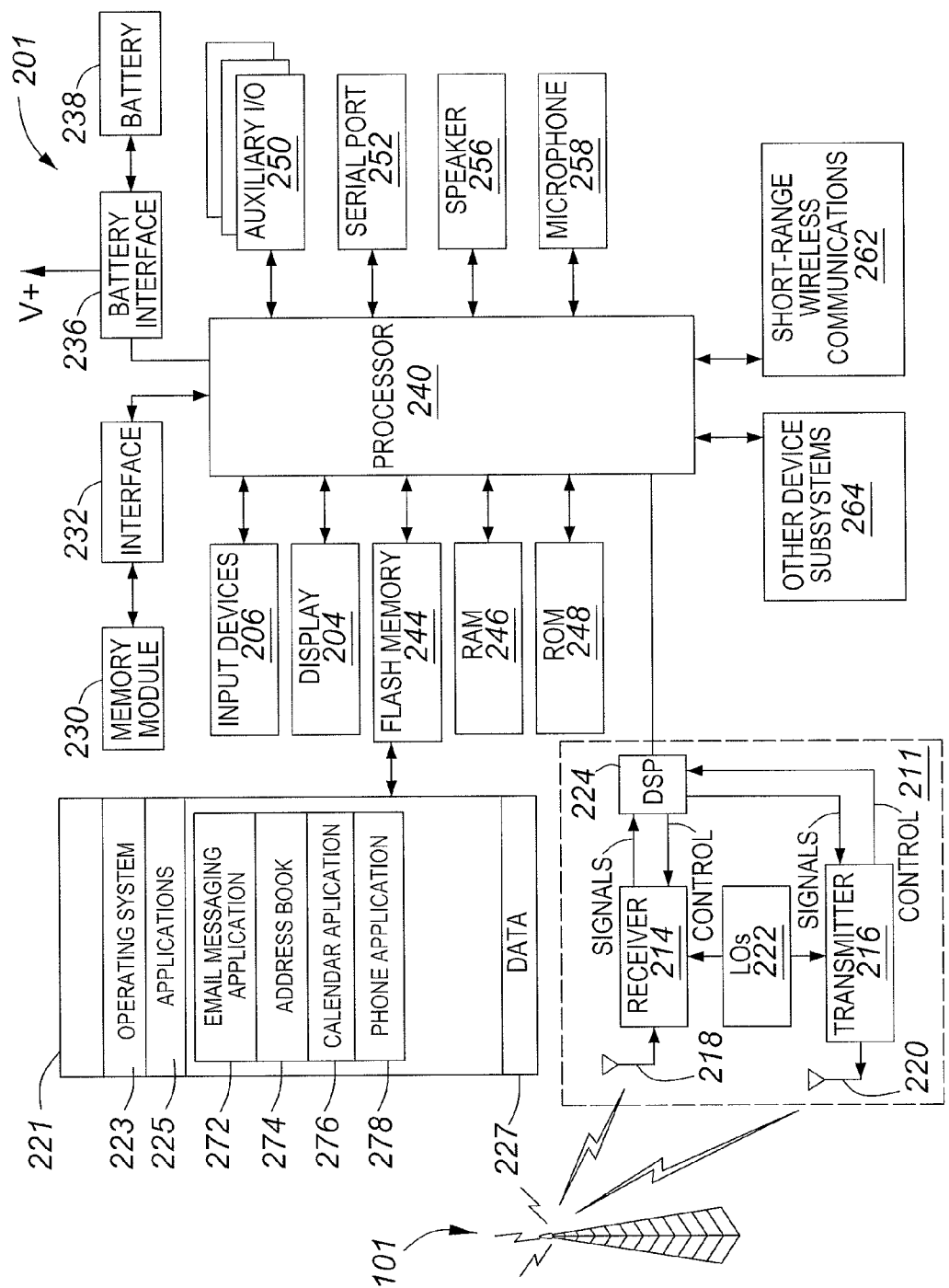
FIG. 2 is a block diagram illustrating a mobile electronic device in accordance with one example embodiment of the present disclosure.

Reference is now made to FIG. 2 which illustrates an exemplary embodiment of the mobile electronic device 201 in which example embodiments described in the present disclosure can be applied. The mobile electronic device 201 is a two-way communication device having data and voice communication capabilities, and the capability to communicate with other computer systems, for example, via the Internet. Depending on the functionality provided by the mobile electronic device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile electronic device 201 includes a rigid case (not shown) housing the components of the device 201. The internal components of the device 201 are constructed on a printed circuit board (PCB). The mobile electronic device 201 includes a controller comprising at least one processor 240 (such as a microprocessor) which controls the overall operation of the device 201. The processor 240 interacts with device subsystems such as a wireless communication subsystem 211 (sometimes referred to as a radio layer) for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. The speaker 256 is a non-limiting example of the acoustic systems described herein. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile electronic device 201 and a single antenna may be shared by both receiver and transmitter, as is known in the art. As will be apparent to those skilled in the field of communication, the particular design of the wireless communication subsystem 211 depends on the wireless network 101 in which mobile electronic device 201 is intended to operate.

The mobile electronic device 201 may communicate with any one of a plurality of fixed transceiver base stations of a wireless network 101 within its geographic coverage area. The mobile electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are output to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223, software applications 225 comprising an email messaging application 272 (also referred to as an email client 272), a personal address book 274, a calendar application 276, and a phone application 278.

The software applications 225 also may include a range of applications, including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary I/O subsystems 250 may comprise an external communication link or interface, for example, an Ethernet connection. The mobile electronic device 201 may comprise other wireless communication interfaces for communicating with other types of wireless networks, for example, a wireless network such as an orthogonal frequency division multiplexed (OFDM) network or a GPS (Global Positioning System) subsystem comprising a GPS receiver or transceiver for communicating with a GPS satellite network (not shown). The auxiliary I/O subsystems 250 may comprise a pointing or navigational input device such as a clickable trackball or optical trackpad or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile electronic device 201 also includes a removable memory card or module 230 (typically comprising flash memory) and a memory card interface 232. Network access is typically associated with a subscriber or user of the mobile electronic device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile electronic device 201 in order to operate in conjunction with the wireless network 101.

The mobile electronic device 201 also stores other data 227 in an erasable persistent memory, which in one example embodiment is the flash memory 244. In various embodiments, the data 227 includes service data comprising information required by the mobile electronic device 201 to establish and maintain communication with the wireless network 101. The data 227 may also include user application data such as email messages, address book and contact information, calendar and schedule information, notepad documents, image files, and other commonly stored user information stored on the mobile electronic device 201 by its user, and other data. The data 227 stored in the persistent memory (e.g. flash memory 244) of the mobile electronic device 201 may be organized, at least partially, into a number of databases each containing data items of the same data type or associated with the same application. For example, email messages, contact records, and task items may be stored in individual databases within the device memory.

The mobile electronic device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile electronic device 201, and the battery interface 236 provides a mechanical and electrical connection for the battery 238. The battery interface 236 is coupled to a regulator (not shown) which provides power V+ to the circuitry of the mobile electronic device 201.

The short-range communication subsystem 262 is an additional optional component which provides for communication between the mobile electronic device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and voice communication applications will normally be installed on the mobile electronic device 201 during or after manufacture. Additional applications and/or upgrades to the operating system 221 or software applications 225 may also be loaded onto the mobile electronic device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile electronic device 201 and may provide enhanced on-device functions, communication-related functions, or both. For example, secure communication applications may enable electronic commerce functions and other such financial transactions to be performed using the mobile electronic device 201.

The mobile electronic device 201 may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile electronic device 201 may also compose data items, such as email messages, for example, using the input devices in conjunction with the display screen 204. These composed items may be transmitted through the communication subsystem 211 over the wireless network 101.

In the voice communication mode, the mobile electronic device 201 provides telephony functions and operates as a typical cellular phone. The overall operation is similar, except that the received signals are output to the speaker 256 and signals for transmission are generated by a transducer such as the microphone 258. The telephony functions are provided by a combination of software/firmware (i.e., the phone application 278) and hardware (i.e., the microphone 258, the speaker 256 and input devices). Alternative voice or audio I/O subsystems, such as a voice message recording subsystem, may also be implemented on the mobile electronic device 201. Although voice or audio signal output is typically accomplished primarily through the speaker 256, the display screen 204 may also be used to provide an indication of the identity of a calling party, duration of a voice call, or other voice call related information.

The phone application 278 can be split into multiple applications or sub-modules, for example one or more user phone modules and a call control module. The user phone modules provide a variety of telephony features through a user interface, while the call control module provides access to common telephony functions desired by the user phone modules, such that telephony requests from phone modules can be coordinated and so that the user phone modules do not need to each provide instructions understood by the wireless communications subsystem 211. The call control function typically makes telephony features available to user phone modules through an application programming interface (API). It is to be recognized that all or part of the phone application 278 features or functions could be provided through the operating system or otherwise distributed in the device 201, while continuing to fall within the term phone application 278.

Figure 3:
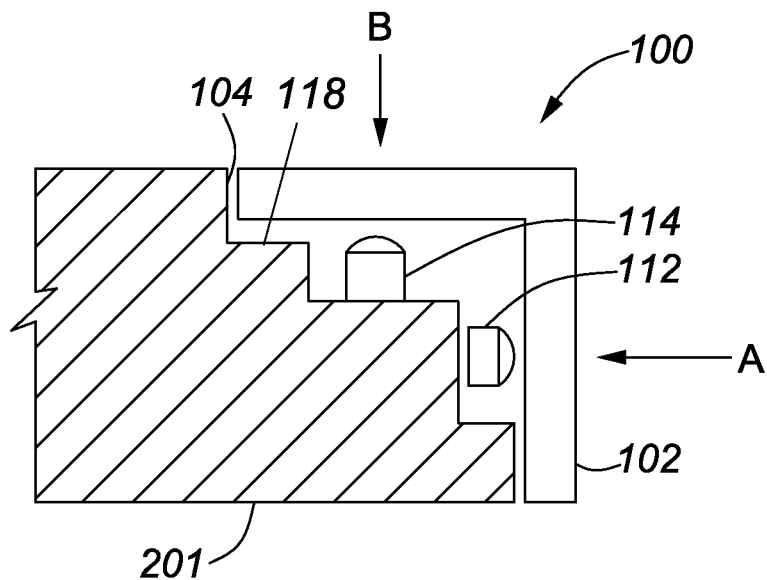
FIG. 3 is a side view of an input mechanism in accordance with one example embodiment of the present disclosure.

Referring now to FIG. 3, an embodiment of the input mechanism 100 for the mobile electronic device 201 will now be described. The input mechanism 100 comprises a cap 102, a first switch 112 and a second switch 114. The input mechanisms 100 is in some embodiments an example of the input devices 206 described with reference to FIG. 2. The cap 102 is received in a recess 118 defined in the body of the mobile electronic device 201. In some embodiments, the cap 102 may be received in the recess 118 so as to be accessible at the outer surface of the mobile electronic device 201, and may also be flush with the outer surface of the mobile electronic device 201. As in the embodiment shown in FIG. 3, the recess 118 may extend over two surfaces of the mobile electronic device 201. The cap 102 is shaped to wrap around an edge 104 of the mobile electronic device 201 and moveable in a first direction A and a second direction B. In some embodiments the directions A and B are towards the edge 104 of the mobile electronic device 201. The first switch 112 is for activating a first function on the mobile electronic device 201 and is covered by the cap 102. The first switch 112 is actuatable upon movement of the cap 102 in the first direction A toward the first switch 112. The second switch 114 is for activating a second function on the mobile electronic device 201 and is also covered by the cap 102. The second switch 114 is actuatable upon movement of the cap 102 in the second direction B toward the second switch 114. In some embodiments, the first function and the second function are the same. In other embodiments, the first function and the second function are different.

In some embodiments, the first direction A is orthogonal to the second direction B. In some embodiments of the input mechanism 100, such as but not limited to the embodiment shown in FIG. 1, the cap 102 wraps around a front surface and a side surface of the mobile electronic device and the first direction A is toward the side surface and the second direction B is toward the front surface.

In some embodiments of the input mechanism 100, the cap 102 is moveable in three or more directions. Examples of such embodiments are shown in FIGS. 4, 5 and 6.

Figure 4:
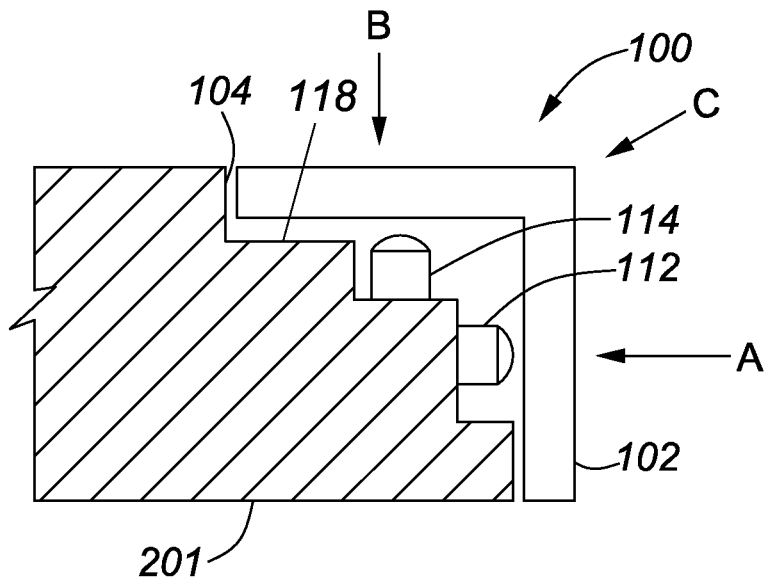
FIG. 4 is a side view of an input mechanism in accordance with one example embodiment of the present disclosure.

Referring to FIG. 4, an example embodiment includes a further direction C between the first direction A and the second direction B. Moving the cap 102 in the further direction C towards the mobile electronic device 201 actuates both the first switch 112 and the second switch 114, which in turn activates a third function on the mobile electronic device 201. In some embodiments, the third function is different from the first function and the second function and in other embodiments the third function is the same as one or both of the first and second functions.

Figure 5:
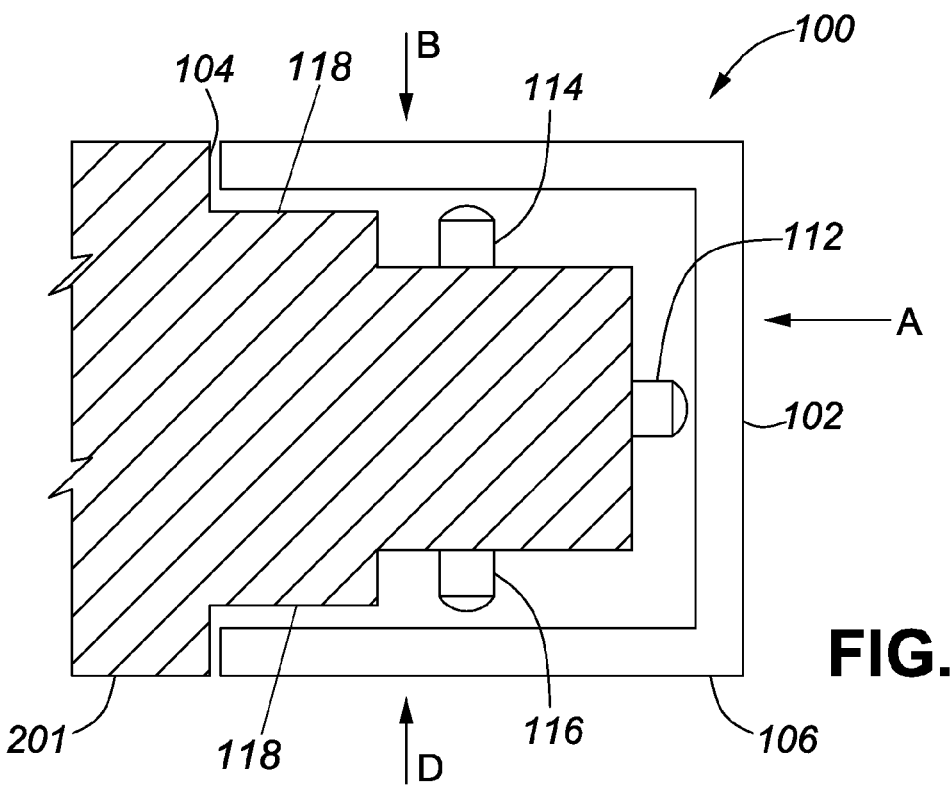
FIG. 5 is a side view of an input mechanism in accordance with one example embodiment of the present disclosure.

Referring now to FIG. 5, in some embodiments the input mechanism 100 further comprises a third switch 116 for activating a third function on the mobile electronic device 201, the third switch 116 being covered by the cap 102 and actuatable upon movement of the cap 102 in a third direction D toward the third switch 116. As in the embodiment shown in FIG. 5, the recess 118 may extend over three surfaces of the mobile electronic device 201. As with the embodiment described with reference to FIG. 4, the third function may be the same as or different from the one or both of the first function and the second function.

Figure 6:
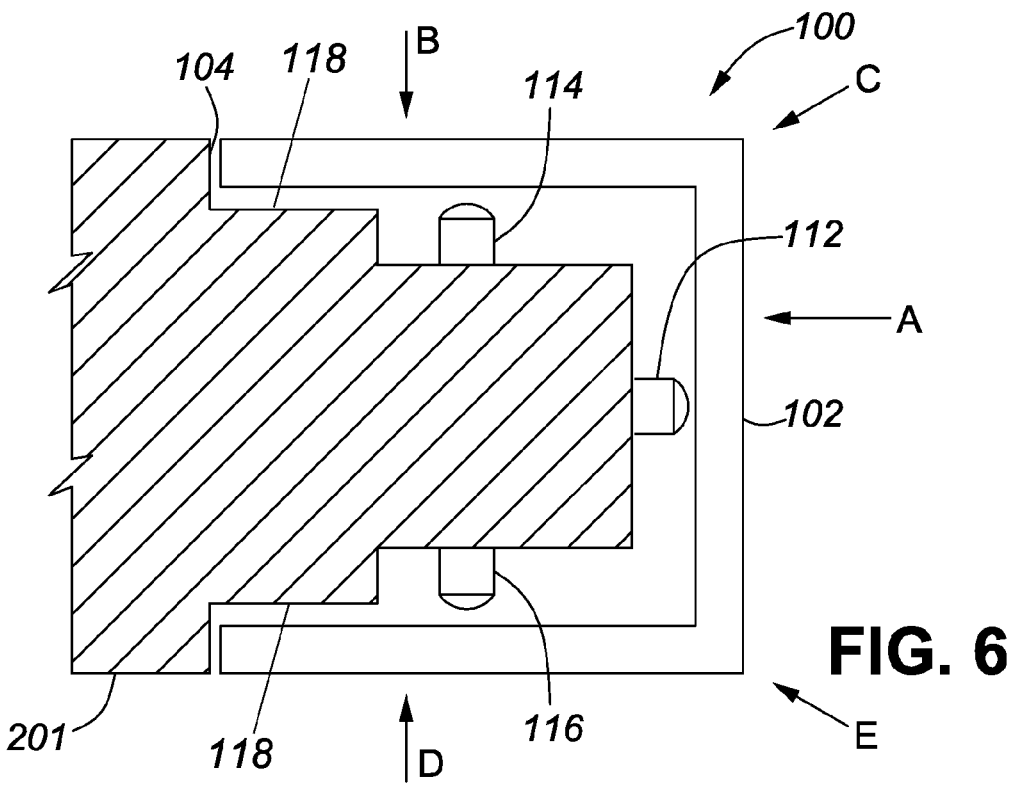
FIG. 6 is a side view of an input mechanism in accordance with one example embodiment of the present disclosure.

Referring to FIG. 6, in an embodiment similar to that described with reference to FIG. 5 with three switches, the cap 102 is activatable in two other directions C and E. Direction C is between directions A and B and moving the cap 102 in direction C towards the mobile electronic device 201 actuates both of the switches 112 and 114. Direction D is between directions A and D and moving the cap 102 in direction E towards the mobile electronic device actuates both of the switches 112 and 116. This embodiment enables a single cap to be used to activate as many as five functions. The input mechanism is not limited to the number of switches and directions of the embodiments described herein. Other embodiments could include more switches and more directions in which the cap 102 is moveable and thus, the number of functions is not limited to five.

In some embodiments, the first direction A is toward a front surface of the mobile electronic device 201, the second direction is toward a side surface of the mobile electronic device, and the third direction is toward a rear surface of the mobile electronic device.

In some embodiments, the first direction A is at a 180° angle to the second direction B. In some embodiments, the first direction A is orthogonal to the second direction B and the first direction is at a 180° angle to the third direction D.

Figure 7:
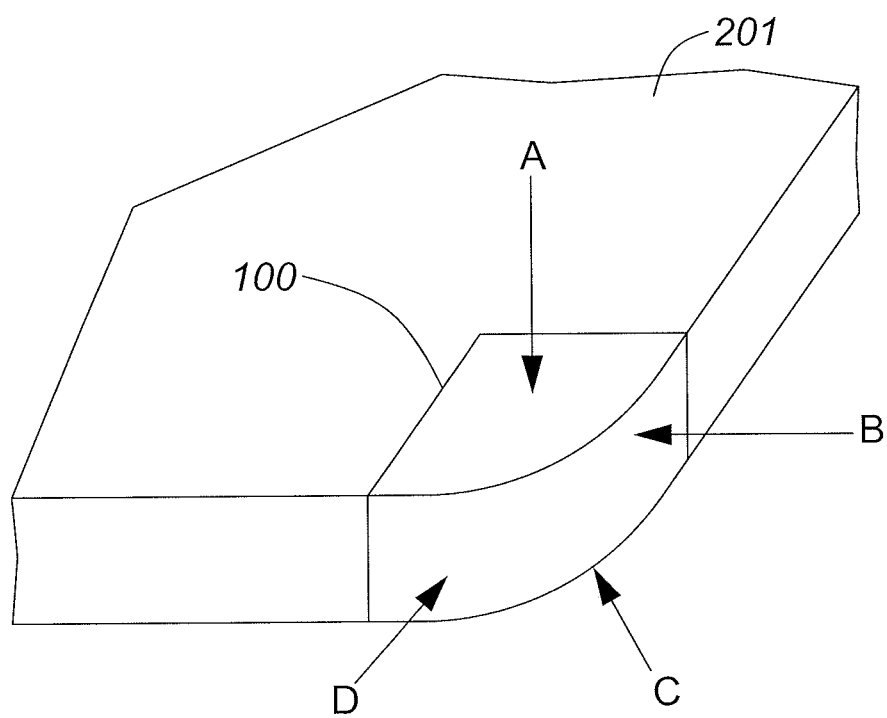
FIG. 7 is a perspective view of an input mechanism in accordance with one example embodiment of the present disclosure.

Referring to FIG. 7, in some embodiments, the cap 100 is shaped to wrap around a corner of the mobile electronic device 201. In some embodiments, the cap is moveable in a direction A toward a front surface of the mobile electronic device, a direction B towards a side surface of the mobile electronic device, a direction C towards a rear surface of the mobile electronic device, and a direction D towards the bottom surface of the mobile electronic device. In further embodiments, the cap is moveable in one or more additional directions between either of the directions A, B, C or D.

Figure 8:
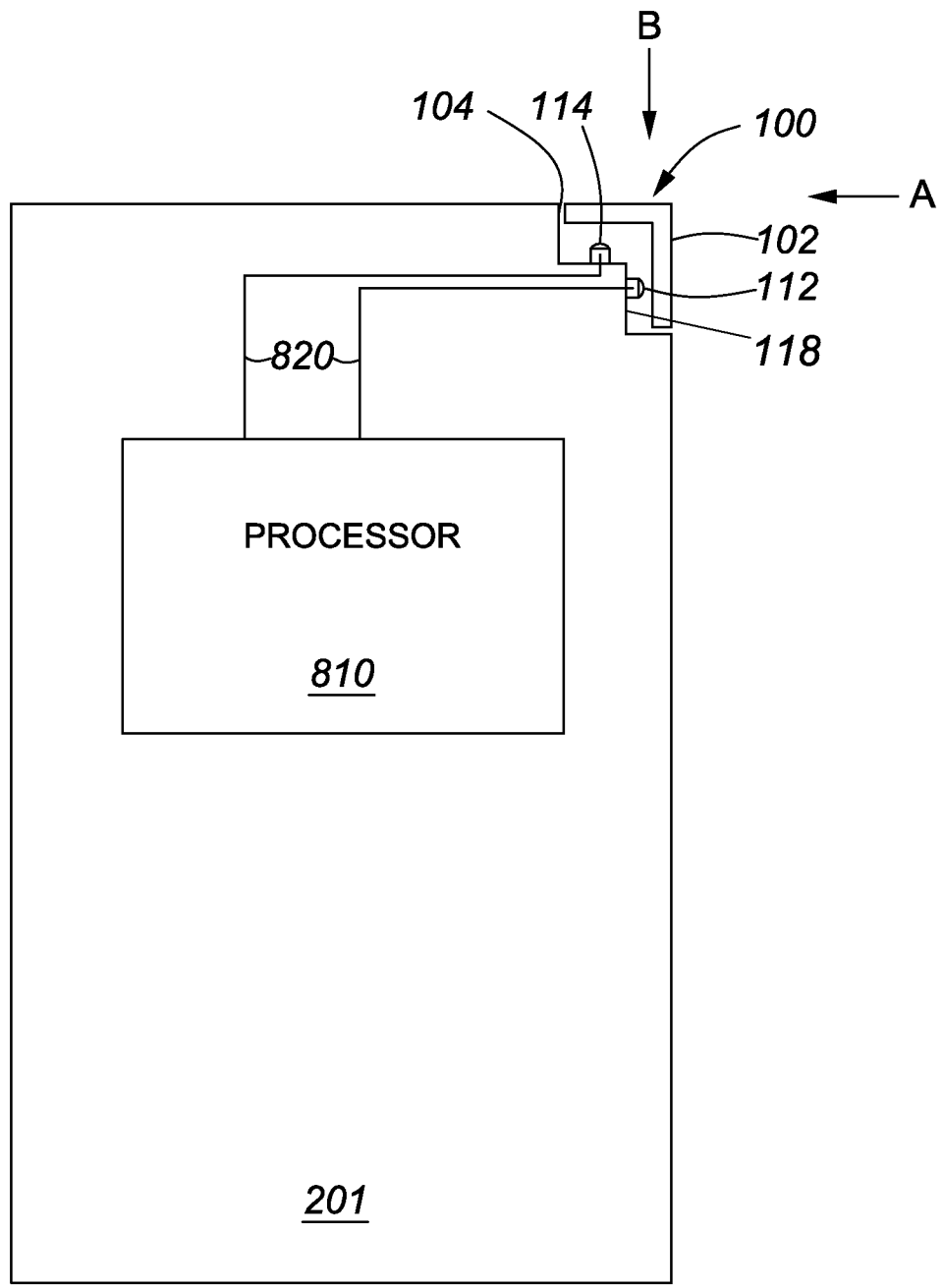
FIG. 8 is a block diagram of a mobile electronic device in accordance with one example embodiment of the present disclosure.

Referring to FIG. 8, a mobile electronic device 201 with an input mechanism 100 according to any embodiment described herein will be described. The mobile electronic device 201 includes the input mechanism 100, a processor 810, and a circuit 820 for connecting the input mechanism 100 to the processor 810. The recess 118 is defined in the body of the mobile electronic device 201 and the cap 102 is received in the recess 118 so as to be accessible from the outer surface of the mobile electronic device 201. As in the embodiment shown in FIG. 8, the cap 102 may also be flush with the outer surface of the mobile electronic device 201. The input mechanism 100 includes the cap 102 shaped to wrap around an edge 104 of the mobile electronic device 201 and moveable in the first direction A and the second direction B. The input mechanism also includes the first switch 112 for activating the first function on the mobile electronic device 201, the first switch being covered by the cap and actuatable upon movement of the cap in the first direction toward the first switch and the second switch 114 for activating the second function on the mobile electronic device, the second switch being covered by the cap and actuatable upon movement of the cap in the second direction toward the second switch. The processor 810 is for implementing the first function upon actuation of the first switch and the second function upon actuation of the second switch.

In some embodiments, the mobile electronic device 201 further comprises a camera and the first function and the second function are functions associated with operating the camera. In some embodiments, the first function is for focusing the camera and the second function is for taking a picture.

In some embodiments, the mobile electronic device 201 further comprises an audio player and the first function and the second function are functions associated with operating the audio player.

In some embodiments, the electronic device further comprises a video player and the first function and the second function are associated with operating the video player.

In some embodiments, the electronic device further comprises a telephone and the first function and the second function are associated with operation the telephone.

In some embodiments, the processor is configured to operate one or more applications and the first function and the second function are associated with the one or more applications.

In some embodiments, the first function and the second function vary according to which of the one or more applications is operating on the mobile electronic device 201.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. An input mechanism for a mobile electronic device, the input mechanism comprising:
    a cap shaped to wrap around an edge of the mobile electronic device, the cap being receivable in a recess of the mobile electronic device so as to be accessible at an outer surface of the mobile electronic device;
    the cap being moveable relative to the mobile electronic device in a first direction towards the mobile electronic device and in a second direction towards the mobile electronic device orthogonal to the first direction;
    a first switch for activating a first function on the mobile electronic device, the first switch being covered by the cap and actuatable upon movement of the cap in the first direction; and
    a second switch for activating a second function on the mobile electronic device, the second switch being covered by the cap and actuatable upon movement of the cap in the second direction.

2. The input mechanism according to claim 1, wherein the mobile electronic device comprises a front surface and a side surface adjacent the front surface, wherein the recess is defined in the front surface and the side surface, and wherein the cap is received in the recess and is movable in the first direction towards the front surface and the second direction towards the side surface.

3. The input mechanism according to claim 2, wherein the mobile electronic device comprises a back surface opposite the front surface, wherein the recess extends from the front surface to the back surface across the side surface, and wherein the cap is moveable in a third direction towards the back surface orthogonal to the second direction, the input mechanism further comprising a third switch for activating a third function on the mobile electronic device, the third switch being covered by the cap and actuatable upon movement of the cap in the third direction.

4. The input mechanism according to claim 1, wherein the cap is moveable in a further direction between the first direction and the second direction and movement of the cap in the further direction towards the mobile electronic device actuates both the first switch and the second switch.

5. The input mechanism according to claim 1, wherein the first function and the second function are different.

6. The input mechanism according to claim 1, wherein the first function and the second function are the same.

7. The input mechanism according to claim 1, wherein the cap is shaped to wrap around a corner of the mobile electronic device.

8. The input mechanism according to claim 1, wherein actuating the first switch and the second switch concurrently activates a third function on the mobile electronic device.

9. The input mechanism according to claim 1, wherein the cap is receivable in the recess so as to be flush with the outer surface of the mobile electronic device.

10. A mobile electronic device comprising:
a body comprising a front surface, a side surface and an edge therebetween, said body having defined therein a recess extending from the front surface to the side surface;
an input mechanism received in the recess, the input mechanism including:
a cap shaped to wrap around the edge;
the cap being moveable in a first direction towards the front surface and in a second direction towards the side surface orthogonal to the first direction;
a first switch for activating a first function on the mobile electronic device, the first switch being covered by the cap and actuatable upon movement of the cap in the first direction; and
a second switch for activating a second function on the mobile electronic device, the second switch being covered by the cap and actuatable upon movement of the cap in the second direction;
a processor for implementing the first function upon actuation of the first switch and the second function upon actuation of the second switch; and
a circuit connecting the input mechanism to the processor.

11. The mobile electronic device according to claim 10, further comprising a camera and wherein the first function and the second function are functions associated with operating the camera.

12. The mobile electronic device according to claim 11, wherein the first function is for focusing the camera and the second function is for taking a picture.

13. The mobile electronic device according to claim 10, further comprising an audio player and the first function and the second function are functions associated with operating the audio player.

14. The mobile electronic device according to claim 10, further comprising a video player and wherein the first function and the second function are associated with operating the video player.

15. The mobile electronic device according to claim 10, further comprising a telephone and wherein the first function and the second function are associated with operation the telephone.

16. The mobile electronic device according to claim 10, wherein the processor is configured to operate one or more applications and the first function and the second function are associated with the one or more applications.

17. The mobile electronic device according to claim 16, wherein the first function and the second function vary according to which of the one or more applications is operating on the mobile electronic device.

18. The mobile electronic device according to claim 10, wherein the body comprises a back surface opposite the front surface, wherein the recess extends from the front surface to the back surface across the side surface, and further wherein the cap is moveable in a third direction towards the back surface orthogonal to the second direction, the input mechanism further comprising a third switch for activating a third function on the mobile electronic device, the third switch being covered by the cap and actuatable upon movement of the cap in the third direction.

19. The mobile electronic device according to claim 10, wherein the cap is moveable in a further direction toward the edge of the mobile electronic device between the first direction and the second direction and wherein movement of the cap in the further direction actuates both the first switch and the second switch.

20. The mobile electronic device according to claim 10, wherein the cap is flush with an outer surface of the body.

* * * * *